United States Patent
Karcher

[11] Patent Number: 5,218,441
[45] Date of Patent: Jun. 8, 1993

[54] METHOD AND APPARATUS FOR REDUCING BRIGHTNESS FLICKERING OF TELEVISION IMAGES

[75] Inventor: Berthold Karcher, Munich, Fed. Rep. of Germany

[73] Assignee: Arnold & Richter Cine Technik GmbH & Co., Munich, Fed. Rep. of Germany

[21] Appl. No.: 671,857

[22] PCT Filed: Sep. 27, 1989

[86] PCT No.: PCT/DE89/00618
§ 371 Date: May 9, 1991
§ 102(e) Date: May 9, 1991

[87] PCT Pub. No.: WO90/04303
PCT Pub. Date: Apr. 19, 1990

[30] Foreign Application Priority Data

Oct. 5, 1988 [DE] Fed. Rep. of Germany ....... 3833823

[51] Int. Cl.⁵ .............................. H04N 5/335
[52] U.S. Cl. .................. 358/213.18; 358/97; 358/209
[58] Field of Search .............. 358/97, 93, 209, 213.18, 358/214, 98; 354/75, 76; 352/131

[56] References Cited

U.S. PATENT DOCUMENTS

| 4,303,322 | 12/1981 | Someya | 354/31 |
| 4,594,608 | 6/1986 | Hatae et al. | 358/93 |
| 4,763,146 | 8/1988 | Niikura | 354/75 |
| 4,769,699 | 9/1988 | Gebauer et al. | 358/97 |
| 5,008,697 | 4/1991 | Noble | 354/413 |

FOREIGN PATENT DOCUMENTS 2486337 1/1982 France.
2184915 7/1987 United Kingdom.

Primary Examiner—Michael T. Razavi
Assistant Examiner—Tuan V. Ho
Attorney, Agent, or Firm—Fish & Richardson

[57] ABSTRACT

Method of reducing the flickering of the brightness of the video image from a television camera with a semiconductor sensor directed at the beam path of a motion picture camera with a rotating mirror shutter, in which the charge of a video half-image is integrated and the signal voltage of the video half-images serves as a video input signal to a screen and/or a video recorder. The video output signal of each video half-image is multiplied by a correction factor which is a function of the ratio of the average exposure time of a video half-image to the actual exposure time of the video half-image which depends on the rotational speed and phase of the mirror shutter as well as the integration window of the video image.

3 Claims, 3 Drawing Sheets

METHOD AND APPARATUS FOR REDUCING BRIGHTNESS FLICKERING OF TELEVISION IMAGES

The invention relates to a method for reducing the flickering of the brightness of a television image from a television camera aimed at the beam path of a television camera as well as a device for working the method.

BACKGROUND OF THE INVENTION

It is known that a television camera can be disposed in the beam path of a motion picture camera making it possible to view on a screen or record on a video recorder the frame independently of the optical finder mounted on the motion picture camera. This also makes it possible to view the frame at a point remote from the motion picture camera and to evaluate the frame immediately without time-consuming development of the motion picture film. The television camera is located in the vicinity of the optical finder of the motion picture camera, i.e. in the beam path behind the rotating mirror shutter, with a beam splitter sending one part of the light reflected by the rotating mirror shutter into the optical finder and another part to the lens of the television camera.

Since the image received by the television camera depends on the taking speed of the motion picture camera and hence on the rotational speed of the rotating shutter of the camera, at certain taking speeds a highly disturbing flickering of the brightness in the video image occurs. Therefore when a television camera is adapted to a motion picture camera it is necessary when evaluating the video image generated by the television camera to eliminate the highly disturbing flickering in the video image that results from using the light reflected from the motion picture camera mirror shutter with a mirror sector which is generally 180°.

Without suitable additional electronics, when using a tube camera as a television camera and a rotational frequency of the mirror shutter as well as a video image frequency of 25 Hz for example, a flickering brightness would result in the video image with a node and antinode in the vertical. At different rotational frequencies of the mirror shutter, on the other hand, the antinode and node, depending on the difference between the rotational frequency of the mirror shutter and the video image frequency, move upward or downward constantly through the video image. Image modulation increases sharply as the rotational speed of the mirror shutter decreases.

FIG. 1 is a block diagram explaining the principle of a television recording from a tube camera 1 coupled with a motion picture camera. Motion picture camera 2 has a lens 21, a rotating mirror shutter 22, and a film plane 25 in which the motion picture film is moved. The light reflected from rotating mirror shutter 22 passes through a ground glass 24 and a beam splitter 26, from which a portion of the beams is conducted to optical finder 27 of motion picture camera 2 and a portion through a camera connection 28 to television camera 1.

The output of television camera 1 is connected by an analog-digital converter 3 and an electronic switch 40 with two video field memories 41, 42, whose output is likewise connected through an electronic switch 43 with a digital-analog converter 6. Two video fields make up one video image.

A sensor 23 provided in motion picture camera 2 detects the rotational speed and position or phase of rotating mirror shutter 22 and delivers a corresponding signal to a control electronic circuit 5, which controls both television camera 1 and video field memories 41, 42 as well as electronic switches 40, 43 and digital-analog converter 6. The output of digital-analog converter 6 is normally connected to a screen 7 and/or a video recorder 8.

The coupling of motion picture camera 2, television camera 1, and the two video field memories 41, 42 makes it possible to eliminate the flickering in the brightness of a tube camera by controlling the scanning of the taking tube of television camera 1 by the position and rotational speed signal of mirror shutter 22 output in sensor 23. With each revolution of mirror shutter 22, exactly one video video field is scanned and recorded in one of the two video field memories 41 and 42. This video field memory 41 or 42 is then repeatedly read until a new video field is stored in the other field memory 42 or 41.

In contrast to television cameras with image tubes, television cameras with semiconductor sensors have the advantage that the television camera need not be re-equipped for the special application of coupling with a motion picture camera or developed for such operation. In addition, television cameras with semiconductor sensors are operated asynchronously and may be synchronized with other television signals as well.

Another important advantage consists in the fact that no image memory is required, with costly control electronics and no analog/digital or digital/analog converter.

Finally, the detail resolution in the vertical of a television camera with semiconductor sensors corresponds to the motion picture camera and the television standard, while this is reduced by half in the vertical in a tube camera with a memory system, since the video fields to be stored are always identical.

Given the advantages of a television camera with semiconductor sensors, the only disadvantage is that in a tube camera with a memory system a video image can be "frozen" and displayed mixed with the current signal with the motion picture camera not running.

SUMMARY OF THE INVENTION

The goal of the present invention is to provide a method and a device for reducing the flickering of the brightness of the video image from a television camera with semiconductor sensors directed at the beam path of a motion picture camera.

The solution according to the invention provides a considerable reduction of the flickering in brightness in black-and-white and color television cameras with complete resolution, is suitable for all television standards, and has the advantage over image tube television cameras of asynchronous camera operation, low circuit cost, small volume, and low power consumption, which is especially important for battery operation of the motion picture and television camera. In addition, an optimal detail resolution in the vertical is ensured. To correct or reduce the flickering in brightness, it is merely necessary to acquire a mirror shutter position and speed signal as well as the video signal from the television camera.

One advantageous embodiment of the solution according to the invention is characterized by the fact that the position and rotational speed of the mirror shutter as well as the integration window for adjusting the true exposure time for each video field are recorded and the quotient of the average and actual exposure times is calculated, and by the fact that a function table is used to obtain a multiplication factor by which the video output signal is multiplied.

One advantageous device for working the method is characterized by the fact that a sensor which detects the rotational speed and phase of the rotating mirror shutter is provided in the motion picture camera, the output signal of said sensor being connected with one input of a processor, whose second input is connected with the output of a synchronization signal detection stage which receives the video output signal from the television camera, by the fact that the output of the processor delivers a correction factor or multiplication factor to a multiplying element, to which the video output signal from the television camera is applied, and by the fact that the multiplier element is connected on the output side with the television screen and/or the television recorder.

This design of the device according to the invention is characterized by low circuit costs and is especially suitable for a working range of the motion picture camera with a film speed of more than twenty frames per second for nearly all applications. This distinguishes the use of a television camera with semiconductor sensors from a tube camera with a memory system, in which, with a television standard of 625 lines and a frequency of 50 Hz, operation is functional only in a working range from 0 to 25 frames per second.

The invention will now be described in greater detail with reference to the embodiment shown in the drawing.

DESCRIPTION OF PARTICULAR EMBODIMENT

Figure 1:
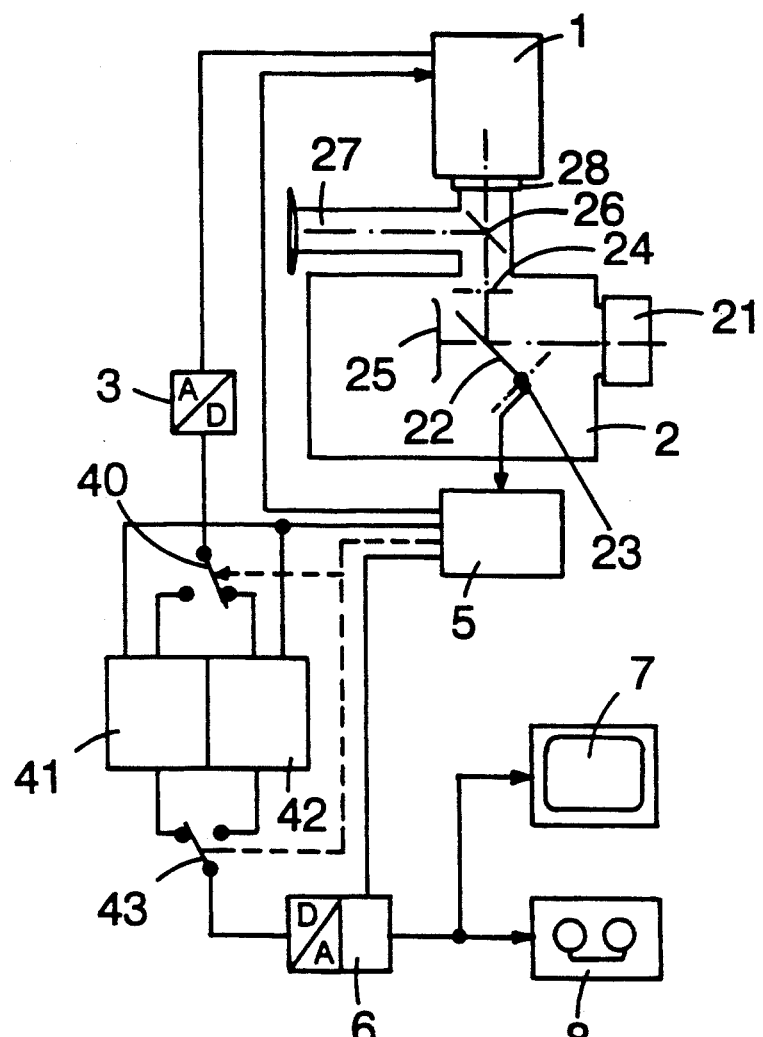
FIG. 1 is a block diagram of a video recording circuit with a tube camera with memory system.
Figure 2:
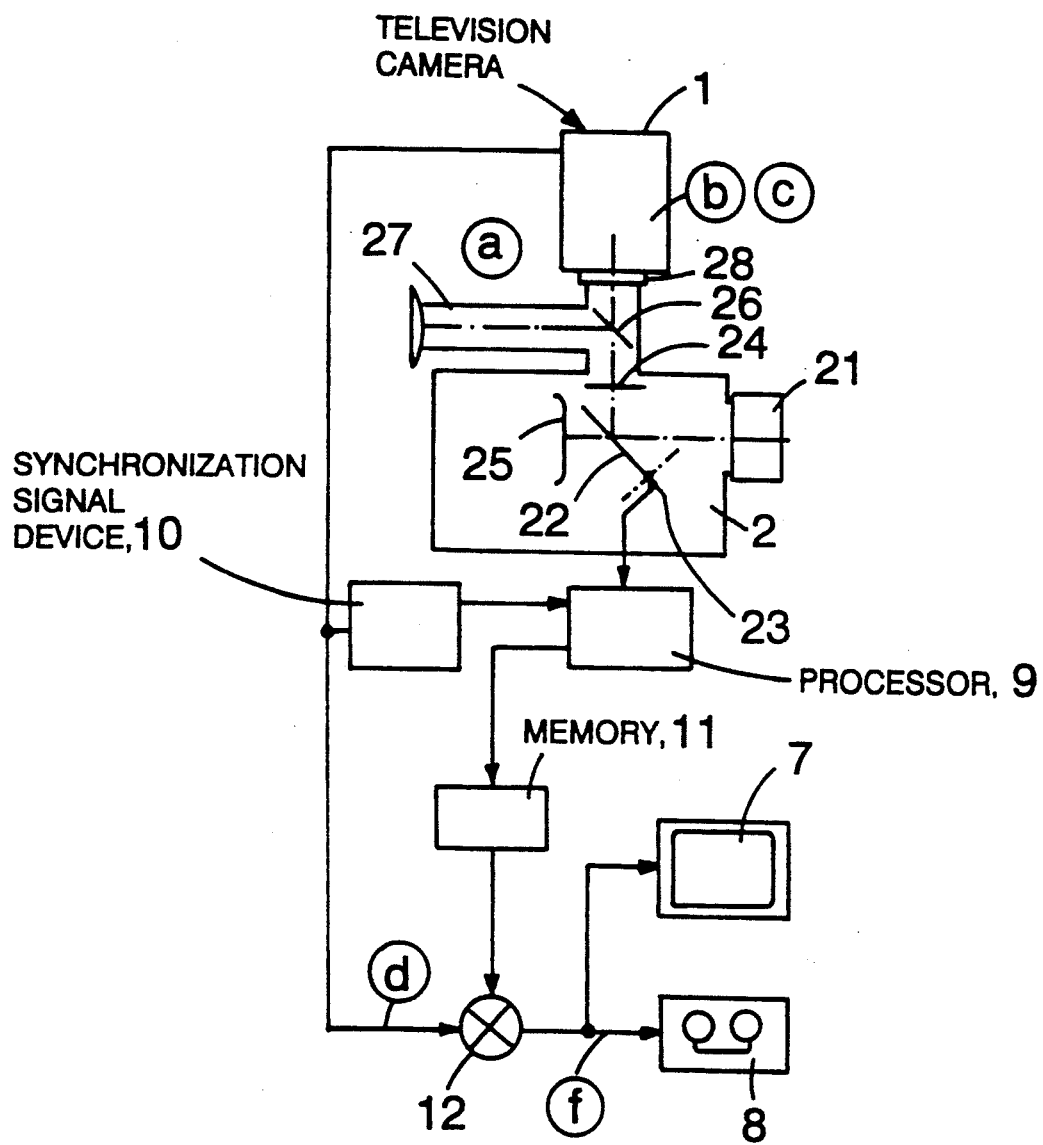
FIG. 2 is a block diagram of a video recording device with a television camera with semiconductor sensors.

FIG. 2 shows a motion picture camera 2 which, as shown in FIG. 1, has a lens 21, a rotating mirror shutter 22, and a film plane 25, in which a motion picture film is moved. Depending on the position of rotating mirror shutter 22, the light beams received by lens 21 strike the motion picture film in film plane 25 or pass through a ground glass 24 to a beam splitter 26, from which one part of the beams is conducted to optical finder 27 or passes through an additional terminal 28 to a television camera with semiconductor sensors 1. Rotating mirror shutter 22 is usually a mirror shutter with a mirror sector of 180°, but a larger mirror sector can also be provided.

A sensor 23, preferably in the form of a light barrier, is provided in the vicinity of rotating mirror shutter 22, said sensor detecting the rotational speed of mirror shutter 22 as well as its position, i.e. its phase. The output signal from sensor 23 is fed to one input of a processor 9.

The video output signal of the television camera with semiconductor sensor 1 is fed to the input of a synchronization signal detection device 10 as well as a multiplier element 12. Synchronization signal detecting device 10 filters the video synchronization signal out of the video output signal of the television camera with semiconductor sensor 1 and feeds an integration window signal to processor 9.

In the embodiment shown in FIG. 2, which relates to a television system with 625 lines and a frequency of 50 Hz, the output of processor 9 is connected with a table memory 11 to which it gives a correction factor KF which determines a multiplication factor MP from the table, which is then applied to a second input of multiplier element 12. The product of the two signals applied to multiplier element 12 are eventually output to a screen 7 and/or a video recorder 8 as a corrected video output signal.

The television camera with semiconductor sensors 1 is a camera with an interline-CCD sensor or frame-transfer sensors with a field integration mode, in which the optical signals that are received are converted by an image converter directly into electrical signals. It is possible to use both a "frame integration mode" and a "field integration mode". The different operating modes merely limit the range of application, but basically permit use of the method according to the invention for reducing the flickering of the brightness.

In the preferred use of a television camera with interline-CCD sensors, suited particularly for an image frequency between 24 and 30 frames per second in the motion picture camera, which permits a frame integration mode, the integration time for one image element corresponds to the time of two video fields. Two video fields make up one video image. Then integration of each pixel in a video field occurs at exactly the same time, since reading of the integrated charges of the interline-CCD sensor takes place in parallel and not in serial fashion as in an image tube. As will be described in greater detail below, with a rotational frequency of mirror shutter 22 that is equal to the video image frequency, the video image is absolutely free of flicker. At a rotational frequency of mirror shutter 22 of motion picture camera 2 that is different from the video image frequency, according to FIG. 2 the image content of each image element is essentially amplitude-modulated.

The integration time for each video field of the semiconductor sensor is the time during which the charge of the individual pixels in the semiconductor sensor is integrated, in other words the time within which the semiconductor sensor receives light.

To eliminate or reduce the flickering of the brightness of a video image, the rotational speed and position or phase of rotating mirror shutter 22 and the integration window of each individual video field are recorded and from this the exposure time of the semiconductor sensor, in other words the duration of the actual illumination of the semiconductor sensor, is determined.

The integration window determines the position and size of the integration interval for each video field of the semiconductor sensor. While the size of the integration window is standard-specific or camera-specific, the position of the integration window can be derived from the synchronization signal of the video signal. Since the synchronization signal is preset, the beginning of the integration time of the semiconductor sensor can be derived relative to the synchronization signal.

This is determined by the fact that the reading of a video field gives the integration time, i.e. the position of the integration window, since the integration has occurred during a space of time which ends with the reading of a new video field. For this reason the position of the integration window can be determined from the synchronization signal of the video signal, which is filtered out by means of synchronization signal detection device 10.

Figure 3:
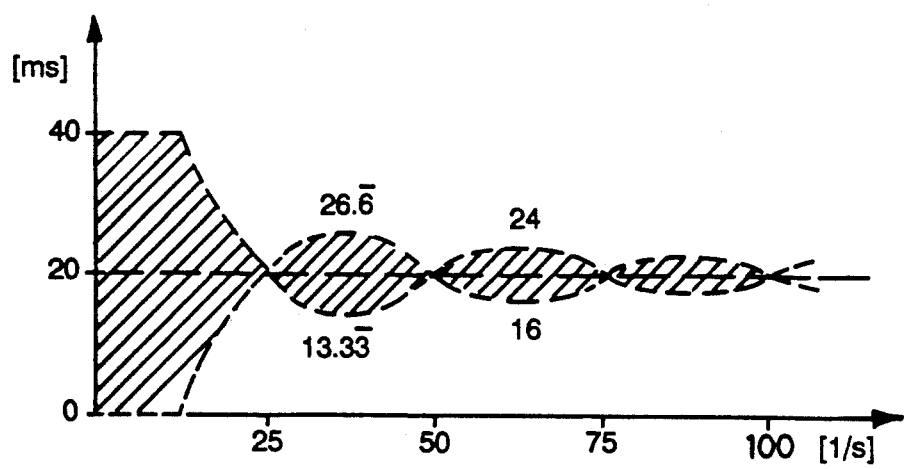
FIG. 3 is a graph showing possible exposure times as a function of the rotational frequency of the mirror shutter of a motion picture camera.

By measuring the exposure time which lies somewhere in a shaded area of possible exposure times in FIG. 3, a correction factor is calculated by means of processor 9 from the quotient of the average exposure time and the actual, i.e. measured, exposure time, so that the exposure time of the semiconductor sensor is standardized on the average exposure time. The correction factor $$KF = \text{average exposure time/actual exposure time}$$

is output to table memory 11, which determines from it a multiplication factor MP, where $$MP = f(KF)$$

and then $$MP \approx (KF)^\gamma$$

This function in a television camera is usually an exponential function with the exponent $0.4 < \gamma < 1$, which comes from the so-called "gamma correction" of a television camera. The exposure of a CCD sensor results in a charge proportional to the exposure which is intergrated and results in a voltage level proportional to the charge. This voltage is corrected with a nonlinear element within the scope of gamma correction and gives the video voltage.

Table memory 11 is a curve memory for the television camera in question, which, depending on the input voltage in question, outputs a corrected video voltage value. The multiplication factor MP output by the table memory, like the video signal, is applied to one input of multiplier element 12 where the signal voltage of the respective video field is multiplied with the corresponding multiplication factor, so that amplitude flicker is corrected.

On the basis of the description of the exposure time per video field using the mirror shutter frequency according to FIG. 3 and the graph of various signals plotted in FIG. 2 according to FIG. 4, the function of the method according to the invention as well as the device according to the invention will now be described in greater detail.

FIG. 3 shows the various exposure times of a semiconductor sensor in television camera 1 as a function of the rotational frequency of mirror shutter 22 of motion picture camera 2 according to FIG. 2. Between the two boundary curves shown in FIG. 3 are the possible exposure times of the semiconductor sensor; the area is shown shaded. The possible exposure times are located between the maximum exposure time for the semiconductor sensor of 40 milliseconds when the semiconductor sensor is constantly illuminated and the minimum exposure times of the semiconductor sensor of zero milliseconds, when the semiconductor sensor is not illuminated.

With a rotational frequency of mirror shutter 22 of less than 12.5 revolutions per second, the semiconductor sensor of television camera 1 receives images or video fields that are completely, i.e. maximally illuminated as well as images and video fields which are not illuminated.

At 12.5 revolutions per second, one image is illuminated very briefly and one image is illuminated completely.

As the rotational speed of mirror shutter 22 is increased further, the minimum exposure time for a video image increases while the maximum exposure time decreases, since mirror shutter 22 is rotating so fast that during the integration interval the light reflected by mirror shutter 22 does not always manage to reach the semiconductor sensor.

At a rotational speed of 25 revolutions per second, exactly one video field is integrated for each revolution of mirror shutter 22, in other words each video field receives the same amount of light so that at a rotational frequency of mirror shutter 22 which is equal to the video image frequency the video image is absolutely flicker-free, in other words there are no difference in brightness. As the rotational frequency of mirror shutter 22 increases further, differences again appear between the individual video fields, which are detected by the semiconductor sensor until, at a rotational frequency of 50 revolutions per second, a flicker-free image is again obtained, and so forth.

Figure 4:
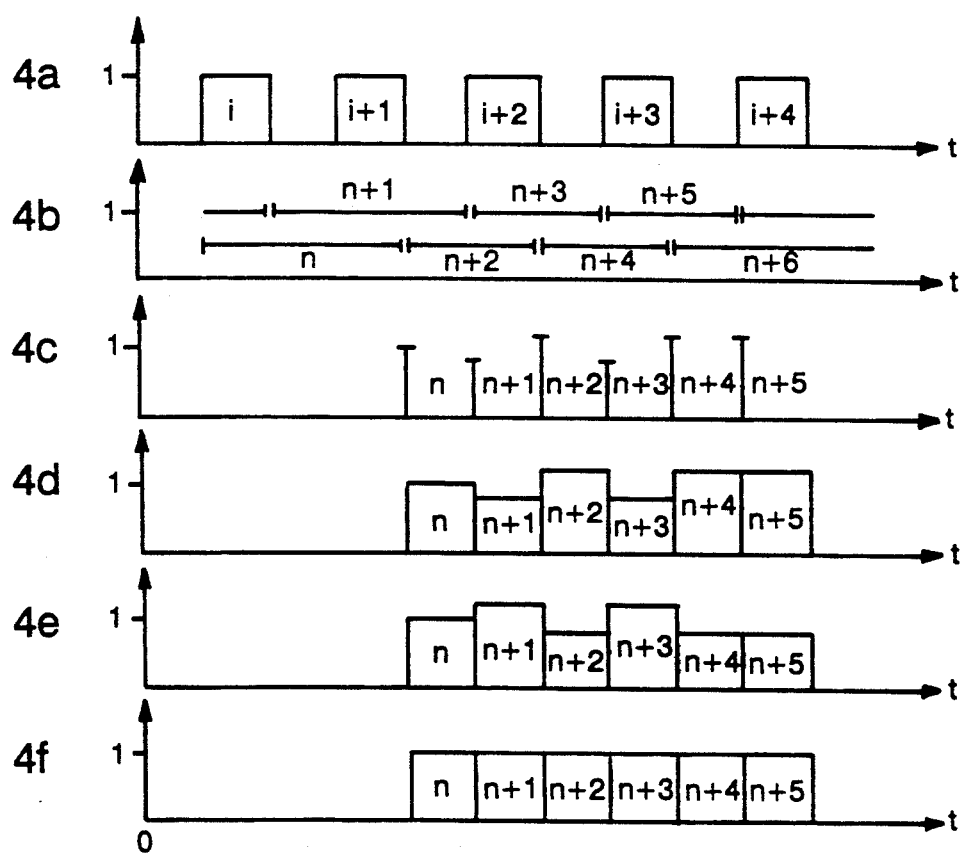
FIG. 4 is a graph of the various signals in FIG. 2.

FIG. 4 shows the curve of the individual pulses or signals at the points indicated in FIG. 2.

FIG. 4a shows the light flux in the finder system of motion picture camera 2 in the area of the beam splitter as it is received by television camera 1. The light flux is composed of individual image illuminations i, i+1, i+2, etc., which appear at intervals in the form of blocks.

FIG. 4b shows the integration windows of the video fields, with successive integration windows overlapping one another. FIG. 4c shows the measured, i.e. actual illumination of the semiconductor sensor as a function of the position of the integration window as well as the rotational speed and position of the mirror shutter, clearly indicating that the individual exposure values are subject to considerable variations.

FIG. 4d shows the video input signal at the input of processor 9, with blocks n, n+1, n+2, n+3, . . . resulting from the individual exposures having amplitudes that correspond to the actual exposure values.

FIG. 4e shows the multiplication factor MP which fluctuates around a value of 1 and upon which the ratio of the average exposure time to the actual exposure time depends.

FIG. 4f shows the video output signal at the output of multiplier element 12, which by multiplying multiplication factor MP with the video input signal, i.e. the output signal of television camera 1, produces a signal with constant amplitude. The invention is not limited in its embodiments to the preferred embodiment given above. Rather, a number of variations are possible which make use of the solution shown even in embodiments which are of fundamentally different design. In particular, the embodiment is not limited to implementation using discrete logical modules, but can advantageously employ programmed logic, preferably using a microprocessor.

I claim:

1. Apparatus for reducing the flickering of the brightness of a video image from a television camera comprising a motion picture camera with a rotating mirror shutter, a television camera directed at the beam path of said motion picture camera, said television camera including a semiconductor sensor in which the charge of a video field is integrated and the signal voltage of said video field charge serving as a video output signal, a synchronization signal detecting stage for receiving said video output signal from said television camera, a sensor for detecting the rotational speed and phase of said rotating mirror shutter, a processor having a first input from said sensor and a second input connected to the output of said synchronization signal detecting stage, said processor including means for generating a correction factor signal, a multiplier, circuitry for applying said video output signal and said correction factor signal to said multiplier for generating a modified video output signal, and circuitry for applying said modified video output signal to an output device such as a television screen or video recorder to reduce the flickering of the brightness of video images from said television camera.

2. The apparatus of claim 1 and further including a table memory, circuitry for delivering said correction factor signal to said table memory, and circuitry for delivering the output of said table memory as a multiplication factor to said multiplier.

3. The apparatus of claim 1 or 2 wherein said television camera includes an interline CCD sensor.

* * * * *